United States Patent [19]

McCloskey

[11] 4,242,784

[45] Jan. 6, 1981

[54] METHOD OF MANUFACTURING A SPHERICAL BEARING

[75] Inventor: Albert R. McCloskey, Fairfield, Conn.

[73] Assignee: The Heim Universal Corporation, Fairfield, Conn.

[21] Appl. No.: 928,040

[22] Filed: Jul. 25, 1978

Related U.S. Application Data

[63] Continuation of Ser. No. 703,820, Jul. 9, 1976, abandoned.

[51] Int. Cl.³ .......................... B21D 53/10; B21K 1/04
[52] U.S. Cl. ............................ 29/149.5 B; 29/149.5 C
[58] Field of Search ................... 29/149.5 R, 149.5 B, 29/149.5 C, 149.5 A, 149.5 DP, 506, 148.4 B; 308/DIG. 8, 2 R, 2 A, 237 R

[56] References Cited

.U.S. PATENT DOCUMENTS

| | | | |
|---|---|---|---|
| 3,147,537 | 9/1964 | Fadow | 29/149.5 B |
| 3,221,391 | 12/1965 | Heim | 29/149.5 B |
| 3,225,420 | 12/1965 | Sullivan, Jr. | 29/149.5 B |
| 3,371,398 | 3/1968 | Patterson et al. | 29/149.5 B |
| 3,662,462 | 5/1972 | Shiflet | 29/149.5 B |
| 3,897,616 | 8/1975 | Williams | 29/149.5 B |
| 3,900,294 | 8/1975 | McCloskey | 29/149.5 B |

*Primary Examiner*—Francis S. Husar
*Assistant Examiner*—V. K. Rising
*Attorney, Agent, or Firm*—James C. Wray

[57] ABSTRACT

A method of manufacturing a spherical bearing having an outer member with an opening therethrough and a concave inner surface on the inner surface of the outer member, an inner member with a convex outer surface complementary to and in precise spherical bearing conformity with the concave inner surface comprising the steps of preforming the inner and outer members to their substantially, final dimensions, forcing the inner member within the opening of the outer member, the inner member acting as a die to enlarge one end of the opening thereby cold working an annular portion of the outer member which surrounds the opening.

13 Claims, 3 Drawing Figures

METHOD OF MANUFACTURING A SPHERICAL BEARING

This is a continuation of application Ser. No. 703,820, filed July 9, 1976, now abandoned.

BACKGROUND OF THE INVENTION

This invention relates generally to a novel method for manufacturing spherical bearings.

More particularly the present invention relates to a method of manufacturing a spherical bearing having an outer member with an opening therethrough and a concave inner surface on the inner surface of the outer member, an inner member with a convex outer surface complementary to and in precise spherical bearing conformity with the concave inner surface comprising the steps of preforming the inner and outer members to their substantially, final dimensions, forcing the inner member within the opening of the outer member, the inner member acting as a die to enlarge one end of the opening thereby cold working an annular portion of the outer member which surrounds the opening.

Spherical bearings or ball and socket type ball bearings are in a broad sense an extremely old art. One only has to look back to the first forms of animal life in which bones and joints were present. Typically, the specifications for spherical bearing assemblies are most exacting as to shape, dimension and overall strength. Spherical bearings present unique problems of achieving uniform bearing contact between the convex outer surface of the ball and the concave inner surface of the outer race member of the socket. This requirement of uniform bearing contact, therefore requires a high order and type of dimensional control over the various elements comprising the spherical bearing assembly as well as the method and apparatus by which the bearing assembly is manufactured.

Spherical bearing assemblies continue to gain wider and wider acceptance in industry and accordingly there are continual efforts to improve upon the quality of the spherical bearing product while at the same time to simplify the method of manufacturing these spherical bearings. Typically, the method of manufacturing these types of bearings have included numerous, complicated and costly steps regarding sophisticated, expensive and difficult to maintain apparatus.

SUMMARY OF THE INVENTION

It is therefore an object of the present invention to provide a versatile, rapid, inexpensive, and easy-to-control method of manufacturing a spherical bearing assembly.

Another objective of the present invention is to provide a simple and unique method of manufacturing a spherical bearing assembly.

It is still another object of the present invention to provide a method of manufacturing a spherical bearing having an outer member with an opening therethrough and a concave inner surface on the inner surface of the outer member, an inner member with a convex outer surface complementary to and in precise spherical bearing conformity with the concave inner surface comprising the steps of preforming the inner and outer members to their substantially, final dimensions, forcing the inner member within the opening of the outer member, the inner member acting as a die to enlarge one end of the opening thereby cold working an annular portion on the outer member which surrounds the opening.

It is yet another important object of the present invention to provide a method of manufacturing spherical bearings wherein the method further comprises forcing the inner member into the opening of the outer member until the inner member passes its equator and is captured within the outer member.

It is still a further objective of the present invention to provide a method of manufacturing spherical bearings wherein the method further comprises centralizing the inner and outer members with respect to each other before forcing the inner member within the outer member.

It is still another important object of the present invention to provide a method of manufacturing spherical bearings wherein the method further comprises capturing the inner member within the outer member by the springing of the annular portion partially back to its original dimensions before it was acted upon by the die action of the inner member.

It is yet another important object of the present invention to provide a method of manufacturing spherical bearings wherein the method further comprises reforming the outer member to its original dimensions after forcing the inner member within the outer member.

It is still a further object of the present invention to provide a method of manufacturing spherical bearings wherein the method further comprises reforming the outer member to its original dimension by applying a compressive force to the outer surface of the outer member.

It is still another important object of the present invention to provide a method of manufacturing spherical bearings wherein the method further comprises applying a compressive force to the outer surface of the outer member by forcing the outer member into and through a progressively tapered die.

It is yet another important object of the present invention to provide a method of manufacturing spherical bearings wherein the method further comprises forming at least one annular staking groove on the radial faces of the outer member before forcing the inner member within the outer member.

Still another object of the present invention is to provide a method of manufacturing spherical bearings wherein the method further comprises forcing the inner member within the outer member by holding the outer member relatively stationary with respect to the inner member and applying the force to the inner member.

It is still another important object of the present invention to provide a method of manufacturing spherical bearings wherein the method further comprises preforming the concave inner surface and the convex outer surface to their final dimensions before forcing the inner member within the opening of the outer member.

It is yet another important object of the present invention to provide a method for manufacturing spherical bearing assemblies which are readily adapted to high volume technique and apparatus and are inexpensive to practice.

It is a further object of the present invention to provide a method of manufacturing spherical bearings wherein the method further comprises forcing the inner member within the outer member by holding the inner member relatively stationary with respect to the outer member and applying the force to the outer member.

It is still another important object of the present invention to provide a method of manufacturing spherical bearings wherein the method further comprises forming at least one oil lubricating bore through the outer member before forcing the inner member within the outer member.

It is a further important object of the present invention to provide a method of manufacturing spherical bearings wherein the method further comprises providing an inner member of harder material than the material of the outer member.

These and other and further objects and features of the invention are apparent in the disclosure which includes the foregoing and ongoing specification with the appended claims and which includes the drawings.

DETAILED DESCRIPTION OF THE DRAWINGS

Figure 1:
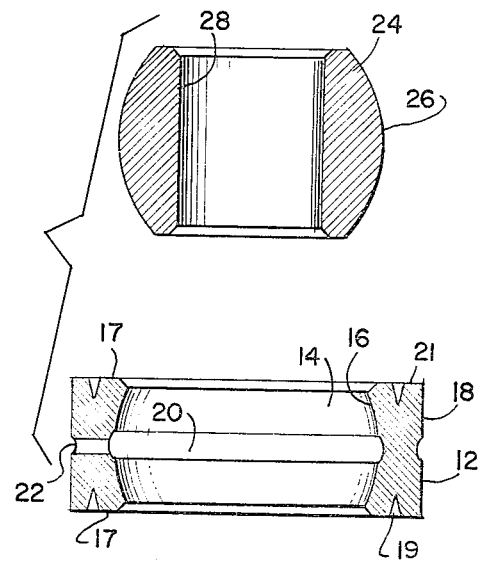
FIG. 1 is a sectional view of an inner and an outer member of a spherical bearing assembly in their unassembled state.
Figure 2:
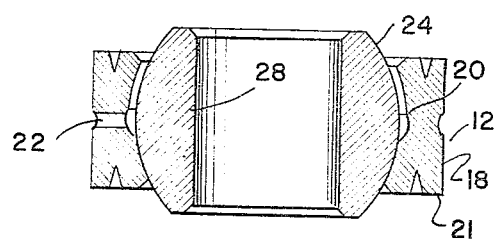
FIG. 2 is the inner and outer members of FIG. 1 wherein the inner member has been forced within the outer member.
Figure 3:
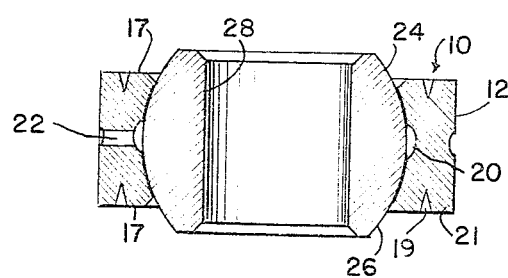
FIG. 3 is the inner and outer members of FIG. 2 wherein both the members are in their final assembled state.

Referring now to the drawings and in particular FIGS. 1 through 3 there is shown the various steps comprising the unique method of manufacturing spherical bearing assemblies in accordance with the present invention as well as a complete spherical bearing assembly 10.

Now more particularly referring to FIG. 1 there is shown a spherical bearing assembly in its unassembled state, the assembly comprising an outer member 12; the outer member 12 is provided with a center hole, bore or opening 14 therethrough. The opening 14 defines the inner surface of the outer member 12, the inner surface 16 being a spherical concave surface.

The outer member 12 is also provided with a substantially cylindrical outer surface 18 and two radially extending faces 17. Typically, the outer member 12 is inserted within a complementary apertured machine element, device, etc. (not shown) such that such machine element or device surrounds and embraces the outer member at its outer surface 18. The radially extending faces 17 may be interrupted by the provision of a staking groove 19 referred to sometimes as a "Grumman type" groove. As their name implies, the staking grooves are used to operationally fix or position the outer member 12 within its associated machine element or the like. The staking grooves 19 may be "V" shaped having a radius of curvature at its base and are provided generally near the intersection of radial faces 17 and outer surface 18 to define a deformable annular lip 21. The deformable lip 21 may be flared into intimate contact with its associated machine element to mechanically fix it therein and thereto. As contemplated by the present invention at least one staking groove 19 may be provided on the radial face 17 of the outer member 12 before the outer member 12 is assembled in accordance with the present invention. This feature of the invention will be explained more fully below.

A lubrication groove 20 is provided on the inner surface 16 of the outer member 12; the lubrication groove being and continuous to provide lubrication around the entire inner surface 16. A lubrication channel or bore 22 is provided through the outer member 12, the bore 22 being in communication with the lubrication groove 20. The bore 22 is the means by which grease or other suitable lubricant is provided to the lubrication groove and this feature of the invention will also be explained more fully below.

The outer member 12 as above-described is provided preformed in essentially its final shape including a number of features such as lubrication groove 20, lubrication bore 22 and staking grooves 19.

In FIG. 1 there is also shown an inner member 24 which is provided with a convex outer spherical surface 26 which is preformed to such dimensions as to be generally complementary to the concave spherical inner surface 16 of the outer member 12. The inner member 24 is also provided with a centrally disposed cylindrical bore 28 therethrough. The central bore 28 is used to operationally attach the inner member 24 to an associated part, machine element, device or the like. This is typically accomplished by nut and bolt arrangement, the shank of the bolt being in registration with the cylindrical bore 28.

As with the outer member 12, this inner member 24 as described above is provided preformed in essentially its final shape including its central bore 28, etc. The preforming of both the inner member 24 and the outer member 12 can be accomplished by a number of techniques such as machining using tools such as lathes and screw machines.

After the preforming of the inner member 24 and the outer member 12, the inner member 24 is then forced within the outer member 12. This unique approach is accomplished by using the inner member 24 as die which acts upon the outer member 12. More particularly, the inner member 24 by die action enlarges one end of the opening 14 to allow the passage and final insertion of the inner member 24 within the opening 14 of the outer member 12. This die action effects cold working of an annular portion of the outer member which surrounds the enlarged opening.

FIG. 2 shows the inner member 24 forcibly inserted within the outer member 12 and further shows how the outer member "springs back" to surround and capture the inner member 24 within its opening. The inner member 24 is forced within the outer member 12 such that the longitudinal axis of the opening 14 would be coincident with the longitudinal axis of the bore 28 of the inner member 24.

It can be further seen in FIG. 2 that the outer member 12 only partially springs back after the die action of the inner member 24. Accordingly, the outer member must be reformed to its original dimensional character to complete the assembled spherical bearing 10 as depicted in FIG. 3. A compressive force is then to be applied to the outer surface 18 of the outer member 12 to bring the concave inner surface 16 into precise spherical bearing conformity with the convex surface 26 of the inner member 24. The degree of bearing tolerance between the inner member 24 and the outer member 12 at their respective bearing surfaces 26 and 16 can be very closely controlled. By varying the preformed dimensions, such as undersizing of the concave inner surface 16, a preselected and predetermined degree of interference fit can be achieved if desired.

It can be seen, therefore, that it is the "die action" of the inner member 24 that effects the assembling of the inner member 24 within the outer member. This action significantly reduces the production costs while at the same time results in a superior bearing product. For example, the staking grooves 19 may be provided on the radial faces 17 of the outer member 12 before the bearing 10 is assembled. This is important, for such machining before assembly allows for easy cleaning of the outer member 12. If, however, the staking grooves 19 are machined after assembly, the metal chips and dirty oil resulting from the machining could contaminate the bearing 10. In the prior art methods of making spherical bearings this step had to be performed after the assembly of the bearing for most of the prior art forming force is exerted on or through the outer member so any staking grooves would be obliterated by such forces, and at the very least such forces would distort the grooves. This obliteration and/or distortion is avoided due to the fact that the reforming of the outer member 12, which may be accomplished by passing the outer member 12 through a progressively tapered conical die, only involves the application of a compressive reforming force to that part of the outer member 12 which has been deformed by the die action of the inner member 24. This limited and controlled application of a compressive reforming force will not obliterate the staking grooves 19 or adversely effect the deformable lip 21. The staking grooves 19 may, therefore, be pre-applied to either or both of the radially extending faces 17 before assembly.

Similarly, the lubrication bore 22 may also be machined through the outer member 12 before assembly. This results in the same benefits as the pre-application of the staking grooves 19, namely, avoidance of contamination of the assembled bearing by metal chips and/or dirty oil resulting from machining the bore 22.

The materials for the outer member 12 or the inner member 24 may be selected from various types of materials, including both heat treated and non-treated steels as for example, SAE 4130 steel, C1018 steel, 440C steel, SAE 52100 steel, etc. The selection of the proper materials and material treatments will depend on a variety of factors including application, environment, size, etc.

As before mentioned the reforming of the outer member 12 may be accomplished by a tapered die. The forms of the remaining portions of the apparatus are to be the subject of another one of my inventions. It might be added, that the present method contemplates a variety of forming motions of the inner member 24 with respect to the outer member 12. That is, the inner member 24 may, for example, be held stationary with respect to the outer member 12, as the inner member 24 is forced within the outer member 12, or vice-versa. Further, they both may be moved with respect to each other.

While the invention has been described with reference to specific embodiments, it will be obvious to those skilled in the art that modifications and variations of the invention may be constructed without departing from the spirit and scope of the invention. The scope of the invention is defined in the following claims.

What is claimed is:

1. A method of manufacturing a spherical bearing comprising preforming an annular metallic outer bearing member with an axial opening therethrough and a concave spheroidal inner bearing surface, preforming an inner bearing member and with a convex outer spheroidal bearing surface complementary to and in precise spheroidal bearing conformity with said preformed concave inner bearing surface of said outer member to substantially final dimensions of the members and bearing surfaces, axially aligning the inner and outer bearing members, forcing the inner member axially within the opening of the outer member, the inner member acting as a die, and uniformly radially expanding and enlarging one end of the outer member, thereby cold working an annular portion of the metallic outer member which surrounds the opening, by stretching the annular portion beyond its elastic limit.

2. A method of manufacturing spherical bearings in accordance with claim 1 wherein the method further comprises forcing the inner member into said opening of said outer member until the inner member passes its equator and is captured within said outer member.

3. A method of manufacturing spherical bearings in accordance with claim 2 wherein the method further comprises capturing the inner member within the outer member by the springing of the annular portion partially back to its original dimensions.

4. The method of manufacturing spherical bearings of claim 1 wherein the method further comprises reforming the outer member to its original dimensions after forcing the inner member within the outer member.

5. The method of manufacturing spherical bearings of claim 4 wherein the reforming step comprises reforming the outer member to its original dimension by applying a compressive force to the outer surface of said outer member.

6. The method of manufacturing spherical bearings of claim 5 wherein the applying a compressive force to the outer surface of said outer member comprises forcing said outer member into and through a progressively tapered die.

7. The method of manufacturing spherical bearings of claim 1 wherein the method further comprises forming at least one annular staking groove on at least one face of the outer member before forcing said inner member within said outer member.

8. The method of manufacturing spherical bearings of claim 1 wherein the forcing said inner member within said outer member comprises holding said outer member relatively stationary with respect to said inner member and applying the force to said inner member.

9. The method of manufacturing spherical bearings of claim 1 wherein the forcing said inner member within said outer member comprises holding said inner member relatively stationary with respect to said outer member and applying the force to said outer member.

10. The method of manufacturing spherical bearings of claim 1 wherein the method further comprises forming at least one oil lubricating channel through said outer member to its inner bearing surface before forcing said inner member within said outer member.

11. The method of manufacturing spherical bearings of claim 10 further comprising preforming a central annular lubrication groove around the inner bearing surface of the outer bearing member in communication with the oil lubricating channel.

12. The method of manufacturing spherical bearings of claim 1 wherein the method further comprises providing an inner member of harder material than the material of the outer member.

13. The method of manufacturing spherical bearings of claim 1 further comprising preforming an annular lubrication groove around a center of the concave spheroidal inner bearing surface of the outer bearing member and wherein the uniformly radially expanding and enlarging step comprises expanding and enlarging a portion of the metallic outer member from a first end to the lubrication groove.

* * * * *